(12) United States Patent
Vu

(10) Patent No.: US 7,702,347 B1
(45) Date of Patent: Apr. 20, 2010

(54) SYSTEM AND METHOD FOR TEMPORARY TALK GROUPS

(75) Inventor: Trinh D. Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 1069 days.

(21) Appl. No.: 11/294,397

(22) Filed: Dec. 6, 2005

(51) Int. Cl.
*H04B 7/00* (2006.01)

(52) U.S. Cl. .................. 455/518; 455/519; 455/521

(58) Field of Classification Search .......... 455/518–521
See application file for complete search history.

(56) References Cited

U.S. PATENT DOCUMENTS

| | | | | |
|---|---|---|---|---|
| 5,423,061 A | * | 6/1995 | Fumarolo et al. | ........... 455/519 |
| 6,600,928 B1 | * | 7/2003 | Ahya et al. | ................. 455/518 |
| 6,640,109 B1 | * | 10/2003 | Drozt et al. | ................. 455/508 |
| 2002/0077136 A1 | * | 6/2002 | Maggenti et al. | ............ 455/518 |

* cited by examiner

*Primary Examiner*—Raymond S Dean

(57) ABSTRACT

Systems and methods for creating temporary dispatch talk groups are provided. A console receives a request to create a temporary dispatch talk group. The temporary dispatch talk group includes at least two existing talk groups. The console accesses a group database in a publicly-accessible wireless network. The temporary dispatch talk group is created in the group database, along with an identification of the lifetime of the temporary dispatch talk group. A temporary dispatch talk group identifier is provided to at least one member of the temporary dispatch talk group. A talk group call for the temporary dispatch talk group can then be initiated using the temporary dispatch talk group identifier.

11 Claims, 4 Drawing Sheets

SYSTEM AND METHOD FOR TEMPORARY TALK GROUPS

BACKGROUND OF THE INVENTION

The mobility afforded by wireless communication networks has resulted in increased usage of such networks. Wireless networks can be divided into private wireless networks and publicly-accessible wireless networks. Private wireless networks, also known as private trunking radio networks, are commonly operated by public safety agencies, taxi services and delivery services. A majority of private wireless networks provide only dispatch communication services, whereas a majority of publicly-accessible wireless networks provide only interconnect communication services. Dispatch communication services are sometimes referred to as "walkie-talkie" communication services because of the half-duplex nature of the communications. Interconnect communication services are what is typically referred to as circuit-switched voice communications.

Private wireless networks typically operate over a limited range of frequencies and within limited geographic areas. Additionally, private wireless networks typically operate using proprietary protocols, have limited expansion capabilities, are expensive to operate and cannot easily interoperate with other private or publicly-accessible wireless networks. In contrast, publicly-accessible wireless networks typically operate over a larger number of frequencies and provide coverage over larger geographic areas. Moreover, publicly-accessible wireless networks use standard protocols, are easier to expand, and interoperate with other publicly-accessible wireless networks.

Private wireless networks are typically preferred by public safety agencies because of the reliability of these networks in emergency situations compared to publicly-accessible wireless networks, which can block calls during emergency situations. Public safety agencies are attracted to publicly-accessible wireless networks as a way to reduce the costs associated with operating and maintaining a private wireless network.

Due to the relative complexity of publicly-accessible wireless networks compared to private wireless networks, some of the features and functionalities provided in private wireless networks are not offered in publicly-accessible wireless networks. Specifically, private wireless networks typically have a single, centrally-located, communications processor (or call handler) for managing and routing communications between wireless stations. In contrast, publicly-accessible wireless networks have a distributed architecture which involves routing communications between a number of communication processors.

SUMMARY OF THE INVENTION

Dispatch communication services typically include both private and group dispatch calls. A private dispatch call is between two communication stations. A group dispatch call is between a number of communication stations (known as a dispatch talk group), and can be initiated using a single call identifier. Typically, prior to initiating the dispatch group call, the membership of a dispatch talk group must be defined in a wireless network database, in order to use a single identifier to initiate the dispatch group call. In publicly-accessible wireless networks, the membership of a dispatch talk group must be provided to the operator of the wireless network, who then creates a record in the wireless network database with the group membership and an associated dispatch talk group ID. The dispatch talk group ID is then provided to all members of the dispatch talk group.

Public safety agencies may encounter situations where communications are required between members of different agencies, e.g., between police and fire departments. Because it may not be known which particular employees of the different agencies will require coordinated communications, it will not be possible to create dispatch talk groups for these inter-agency communications prior to when such communications are required. When different public safety agencies are supported by separate private wireless networks, dispatch talk groups with memberships comprising communication units of different public safety agencies cannot be easily generated.

To address the above-identified and other deficiencies of conventional wireless networks, the present invention provides systems and methods for creating temporary dispatch talk groups. A dispatch console operator receives a request to create a temporary dispatch talk group comprising at least two existing dispatch talk groups. The dispatch console operator accesses a group database in a publicly-accessible wireless network to register the temporary dispatch talk group. The dispatch console operator also provides a group ID to one of the members of the temporary dispatch talk group. A dispatch call between members of the temporary dispatch talk group is initiated using the temporary dispatch talk group ID.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1A:
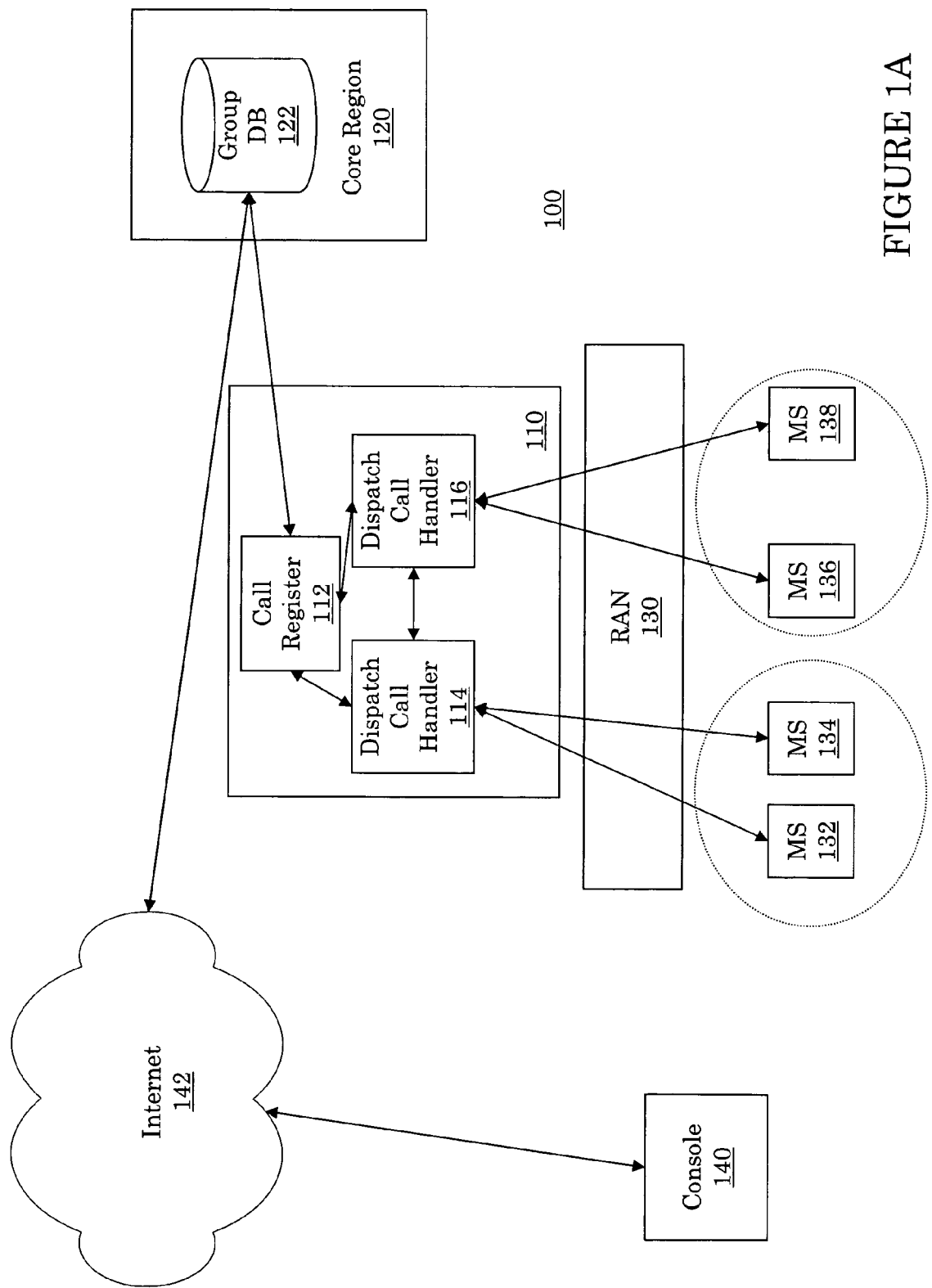
FIGS. 1A and 1B illustrates exemplary systems in accordance with the present invention.

FIG. 1A illustrates an exemplary system 100 in accordance with the present invention. The system 100 includes a dispatch area network subsystem 110, a core region 120 and a radio access network (RAN) 130. A dispatch area is a geographic area which includes two or more cells that share network subsystems, such as mobile switching centers (MSCs) and location registers. The dispatch area network subsystem 110 includes a call register 112, and first and second dispatch call handlers 114 and 116. The core region 120 includes a group database 122. The call register 112 generally operates in a similar manner to a location register and performs the functions of a home location register (HLR) to register and authenticate the user. Each call handler generally operates in a similar manner to an MSC/visitor location register (MSC/VLR) or a dispatch application processor (DAP). The group database 122 can be a general purpose computer with associated storage, or the like. Accordingly, as will be described in more detail below, the group database 122 has the ability to process information, set and monitor timers, and make determinations based on the processed information and the timers. The first dispatch call handler supports communications from mobile station 132 and 134, and the second dispatch call handler supports communications from mobile stations 136 and 138. The system also includes a console 140 which connects to the group database 122 via the Internet 142.

Figure 1B:
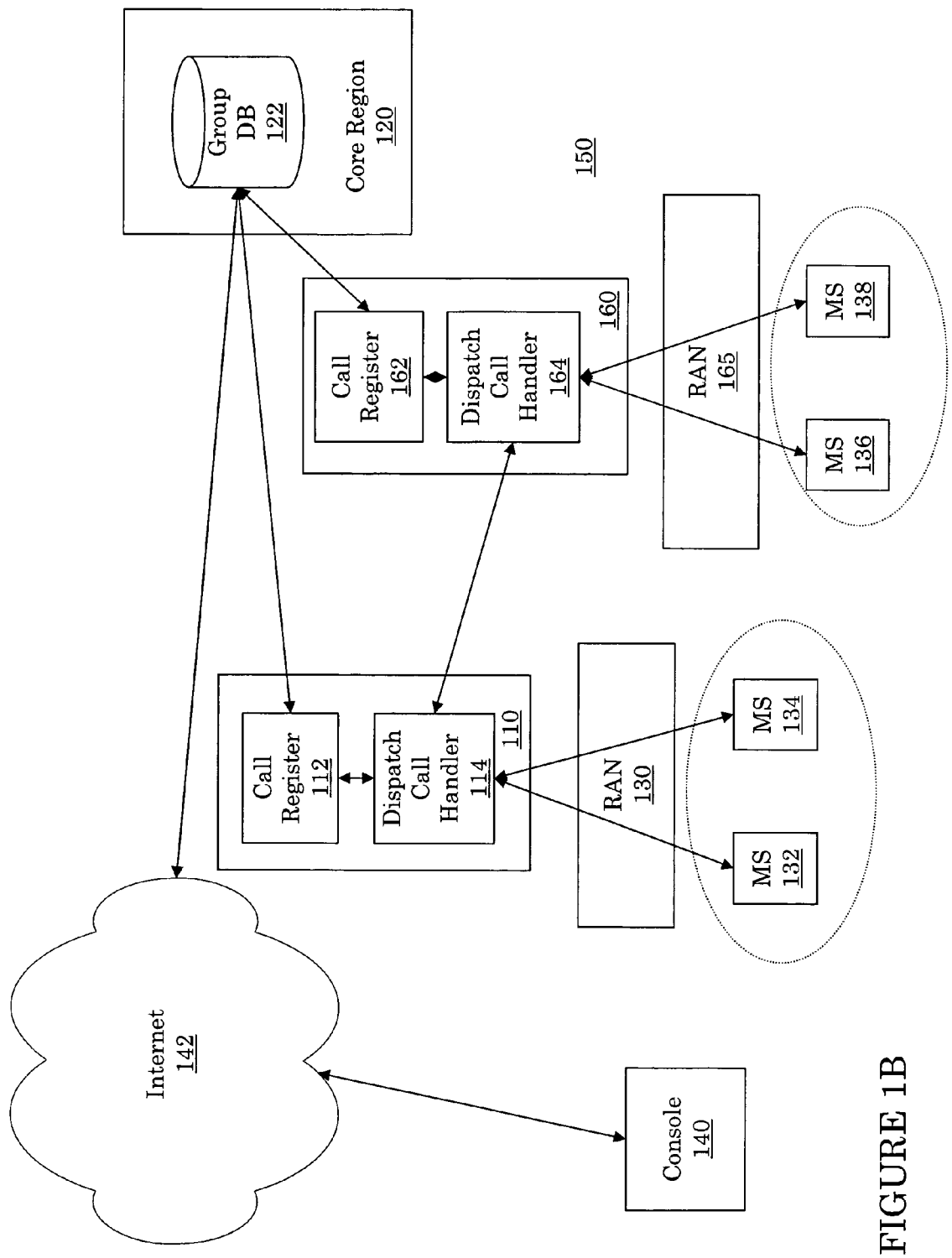

FIG. 1B illustrates a system in accordance with another embodiment of the present invention. The system illustrated in FIG. 1B is similar to the system illustrated in FIG. 1A, and hence, like elements include the same reference numbers. The difference between the systems of FIGS. 1A and 1B is that in FIG. 1A the first and second dispatch call handlers 114 and 116 are located in the same dispatch area network subsystem 110, whereas in FIG. 1B, the first and second dispatch call handlers are located in different dispatch area network subsystems 110 and 160. Because the second dispatch call handler 164 is located in a different dispatch area network subsystem than the first dispatch call handler 114, the second dispatch call handler uses a different call register and RAN, i.e., call register 162 and RAN 165.

Figure 2:
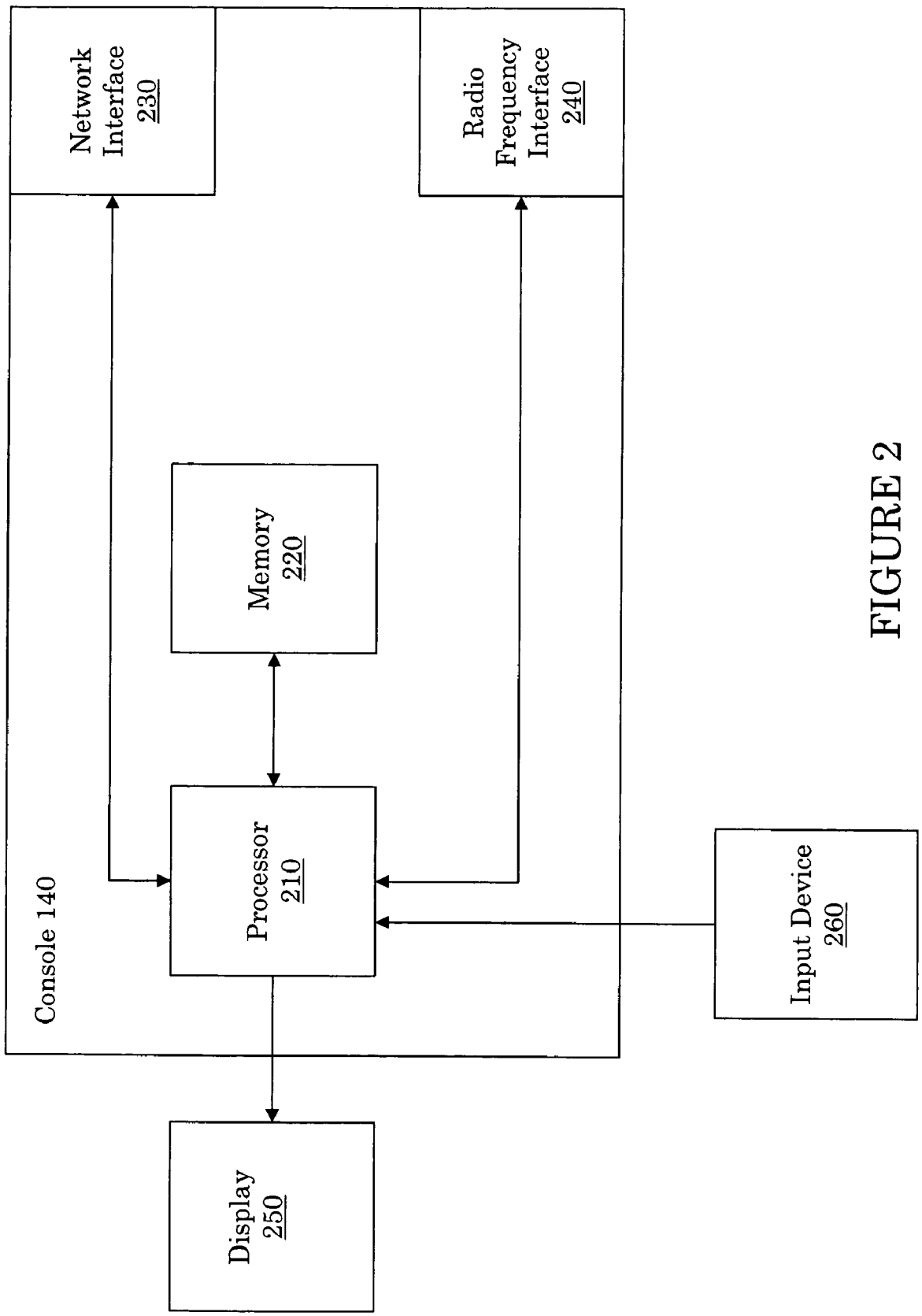
FIG. 2 illustrates an exemplary dispatch console in accordance with the present invention.

FIG. 2 illustrates an exemplary dispatch console 140 in accordance with the present invention. The dispatch console includes a processor 210 coupled to memory 220, network interface 230, radio frequency interface 240, display 250 and input device 260. The processor can be a microprocessor, application specific integrated circuit (ASIC), field programmable gate array (FPGA), or the like. The memory 220 can be random access memory (RAM), flash memory, a hard drive, or the like.

In accordance with exemplary embodiments of the present invention, an operator of console 140 receives a request to create a temporary dispatch talk group via radio frequency interface 240. The console 140 accesses the group database 122 via network interface 230. The display 250 can provide a web-based interface in order to create a temporary dispatch talk group, define the membership of the temporary dispatch talk group, set priority values for members of the temporary dispatch talk group, and set an expiration time (i.e., the lifetime) of the temporary dispatch talk group. The membership of the temporary dispatch talk group is defined using talk group IDs of existing dispatch talk groups. The priority values are used to arbitrate access to the floor of a call for the temporary talk group. Instead of using a web-based interface, the processor 210 can run a program, with its own interface output to display 250, to access the group database 122. The operator of the console 140 programs the group database information using input device 260. The input device 260 can be, for example, a keyboard, a pointing device, such as a mouse, or the like.

Figure 3:
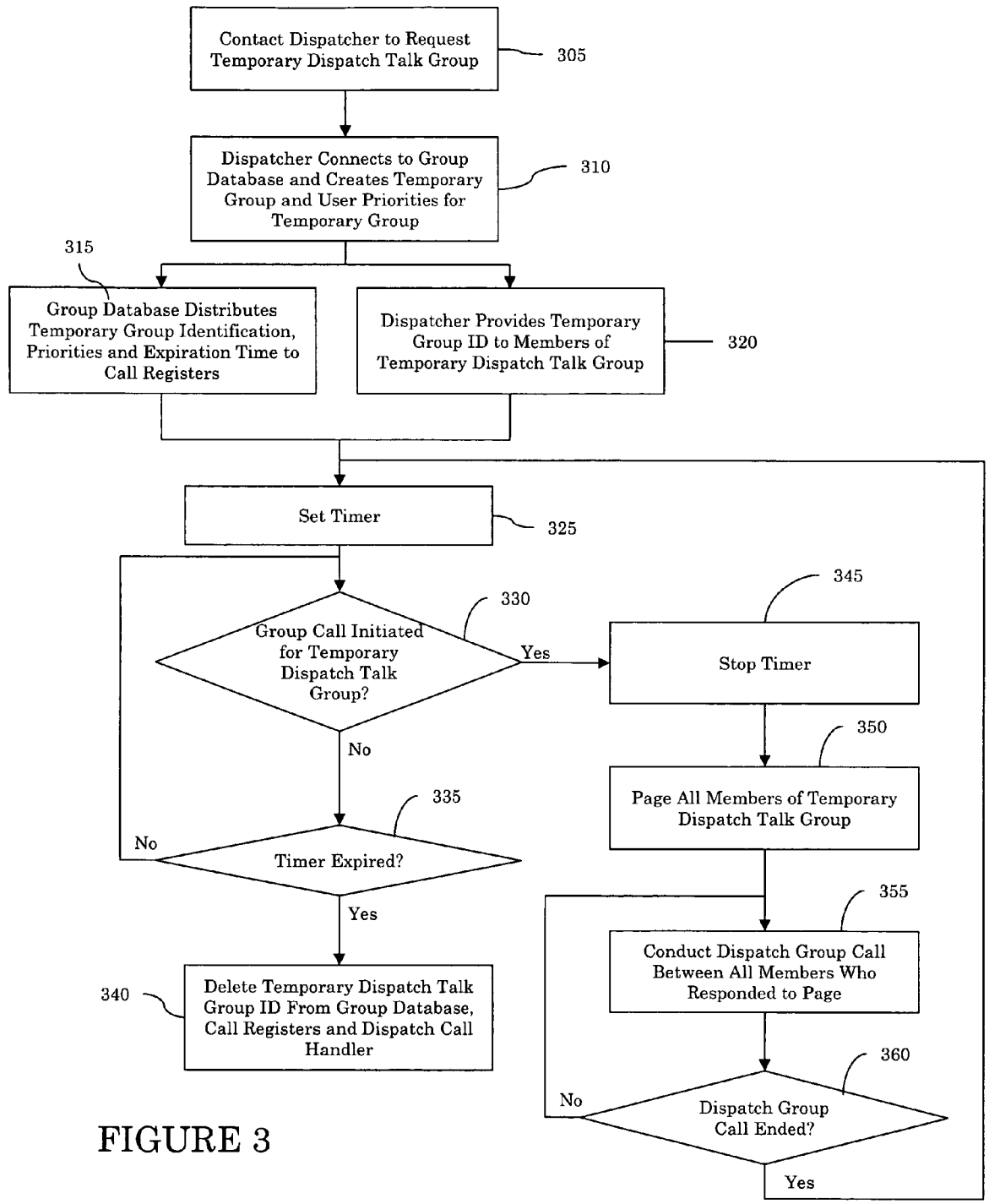
FIG. 3 illustrates an exemplary method for creating temporary dispatch talk groups and communicating using the temporary dispatch talk groups in accordance with the present invention.

FIG. 3 illustrates an exemplary method for creating a temporary dispatch talk group and communicating using the temporary dispatch talk group in accordance with the present invention. A dispatcher at console 140 is contacted with a request to form a temporary dispatch talk group (step 305). If the console 140 supports dispatch communications, the operator can be contacted via the console 140. The console can receive dispatch calls via the Internet 142 or via the RAN 130. If the console 140 does not support dispatch communications, the operator can receive requests for temporary dispatch talk groups using a separate dispatch or interconnect communication station (not illustrated).

The dispatcher, using console 140, connects to the group database 122 via the Internet 142, and creates the desired temporary talk group, defines the membership, sets priorities for members of the temporary talk group, and sets the expiration time for the temporary dispatch talk group (step 310). The group database 122 distributes the temporary group identification, priorities and expiration time to call register 112 and/or 162 (step 315), and the dispatcher provides the temporary group ID to members of the temporary dispatch talk group (step 320). The dispatcher can provide the temporary group ID by transmitting a message, via the RAN 130, to the mobile stations. Alternatively, the dispatcher can establish a dispatch or interconnect call with the requestor of the temporary dispatch talk group to provide the temporary group ID. Because a dispatch talk group call is initiated by a single member of the talk group, the temporary group ID only needs to be provided to one member of the talk group.

The call register or call handler 122 sets a timer (step 325). The element that set the timer determines whether a group call has been initiated for the temporary dispatch talk group (step 330). If a dispatch group call has not been initiated for the temporary dispatch talk group ("No" path out of decision step 330), then the element that set the timer determines whether the timer has expired (step 335). If the timer has expired ("Yes" path out of decision step 335), then the temporary dispatch talk group ID is deleted from the group database 122, call register and dispatch call handler. If a dispatch communication request is received for the temporary group ID, the requester will be provided with a message that the temporary dispatch talk group is not available. If the timer has not expired ("No" path out of decision step 335), then the element that set the timer continues to determine whether a group call has been initiated for the temporary dispatch talk group (step 330).

If the determines that a group call has been initiated for the temporary dispatch talk group ("Yes" path out of decision step 330), then the timer is stopped (step 345). If information for the temporary dispatch talk group is not already cached in the dispatch call handler, then the call handler will contact the call register to obtain information regarding the temporary dispatch talk group, which can be performed as part of the process (described above) of informing the call register of the initiation of the dispatch call for the temporary dispatch talk group. Additionally, if members of the temporary dispatch talk group are supported by other dispatch call handlers, the dispatch call handler, which received the dispatch talk group request, will inform the other call handlers of the dispatch talk group request and forward information regarding the temporary dispatch talk group. Alternatively, the other dispatch call handlers can request information regarding the temporary dispatch talk group from the call handler supporting the dispatch call handler. The dispatch call handlers, which are supporting members of the temporary dispatch talk group, will page all members of the temporary talk group (step 350) and then conduct a dispatch group call between all members who responded to the page (step 355).

The element that set the timer determines whether the dispatch group call has ended (step 360). If the dispatch group call has not ended ("No" path out of decision step 360), then the group call continues (step 355). If, however, the dispatch group call has ended ("Yes" path out of decision step 260), then the timer is set (step 325).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for creating temporary dispatch talk groups, the method comprising the acts of:

receiving a request to create a temporary dispatch talk group, wherein the temporary dispatch talk group includes at least two existing talk groups;
accessing a group database in a publicly-accessible wireless network;
creating the temporary dispatch talk group in the group database, wherein the temporary dispatch talk group has a limited lifetime;
providing an identification of the temporary dispatch talk group to at least one member of the temporary dispatch talk group;
setting a timer, wherein the timer corresponds to the limited lifetime of the temporary dispatch talk group; and
deleting the temporary talk group identification and membership and priority information for the temporary talk group upon expiration of the timer,
wherein the timer is stopped when a dispatch talk group communication for the temporary talk group is initiated and the timer is reset when the dispatch talk group communication has ended, and
wherein the publicly accessible wireless network includes multiple dispatch communications processors coupled to mobile stations through a radio access network.

2. The method of claim 1, wherein the act of creating the temporary dispatch talk group further comprises the acts of:
defining a membership of the temporary dispatch talk group; and
setting priorities for one or more members of the temporary dispatch talk group for arbitrating access to a floor of a call for the temporary dispatch talk group.

3. The method of claim 1, further comprising the act of:
distributing the temporary dispatch talk group identification, membership and priorities to at least two call registers.

4. The method of claim 1, wherein the request to create a temporary dispatch talk group is received by a dispatcher and the dispatcher provides the identification of the temporary dispatch talk group to a communication station which sent the request.

5. A dispatch console, comprising:
a first interface which receives a request to create a temporary dispatch talk group, wherein the temporary dispatch talk group includes at least two existing talk groups;
a second interface used for accessing a group database in a publicly-accessible wireless network;
a processor, coupled to the first and second interfaces, which creates the temporary dispatch talk group in the group database, wherein the temporary dispatch talk group has a limited lifetime, and an identification of the temporary dispatch talk group is provided to at least one member of the temporary dispatch talk group,
wherein the processor sets a timer, such that an expiration time of the timer corresponds to the limited lifetime of the temporary dispatch talk group, wherein the timer deletes the temporary talk group identification, membership information for the temporary talk group and priorities from the group database upon expiration of the timer,
wherein the timer is stopped when a dispatch talk group communication for the temporary talk group is initiated and the timer is reset when the dispatch talk group communication has ended, and
wherein the publicly accessible wireless network includes multiple dispatch application processors coupled to mobile stations through a radio access network.

6. The dispatch console of claim 5, wherein the first interface is a radio access network interface and the second interface is a network interface.

7. The dispatch console of claim 5, wherein the first and second interfaces are the same interface, which is a network interface.

8. The dispatch console of claim 5, wherein the creation of the temporary dispatch talk group involves defining a membership of the temporary dispatch talk group, and setting priorities for one or more members of the temporary dispatch talk group for accessing the floor of a dispatch call for the temporary dispatch talk group.

9. A publicly-accessible communication network, comprising:
a group database which stores dispatch talk group information, and receives information for a temporary dispatch talk group from a console, wherein the temporary dispatch talk group has a limited lifetime;
a call register coupled to the group database, wherein the call register receives the information for the temporary dispatch talk group from the group database; and
first and second dispatch call handlers coupled to the call register, wherein the first and second dispatch call handlers receive the information for the temporary dispatch talk group from the call register,
wherein the call register sets a timer, such that an expiration time of the timer corresponds to the limited lifetime of the temporary dispatch talk group, wherein the timer deletes the temporary talk group identification, membership information for the temporary talk group and priorities from the group database upon expiration of the timer,
wherein the call register stops the timer when a dispatch talk group communication for the temporary talk group is initiated and the call register resets the timer when the dispatch talk group communication has ended, and
wherein the publicly accessible wireless network includes multiple dispatch communication processors coupled to mobile stations through a radio access network.

10. The publicly-accessible communication network of claim 9, wherein the information for the temporary dispatch talk group comprises a temporary talk group identification, membership and priorities that control access to the floor of dispatch calls for the temporary dispatch talk group.

11. The method of claim 1, wherein the timer is set to correspond to the limited lifetime of the temporary dispatch talk group upon the ending of a dispatch talk group communication for the temporary talk group.

* * * * *